United States Patent [19]

Heimberger et al.

[11] 4,418,449
[45] Dec. 6, 1983

[54] SLIDE FASTENER

[75] Inventors: Helmut Heimberger, Steinhausen; Helmut Wulz, Birmensdorf, both of Switzerland

[73] Assignee: Optilon W. Erich Heilmann GmbH, Cham, Switzerland

[21] Appl. No.: 197,597

[22] Filed: Oct. 16, 1980

[30] Foreign Application Priority Data

Oct. 17, 1979 [DE] Fed. Rep. of Germany ....... 2942009
Nov. 16, 1979 [DE] Fed. Rep. of Germany ....... 2946229

[51] Int. Cl.³ .......................................... A44B 19/06
[52] U.S. Cl. ..................................... 24/401; 24/410; 24/413; 24/408
[58] Field of Search ................ 24/205.1 R, 205.13 R, 24/205.13 D, 205.16 R, 205.16 D

[56] References Cited

U.S. PATENT DOCUMENTS

| 2,380,623 | 7/1945 | Winterhalter | 24/205.16 R |
| 2,496,925 | 2/1950 | Winterhalter | 24/205.16 R |
| 2,897,567 | 8/1959 | Hubner | 24/205.13 R |
| 3,114,952 | 12/1963 | Morin | 24/205.13 R |
| 3,696,473 | 10/1972 | Jones | 24/205.13 R |
| 3,874,038 | 4/1975 | Takamatsu | 24/205.13 R |
| 3,885,273 | 5/1975 | Heimberger | 24/205.13 D |
| 4,080,691 | 3/1978 | Moertel | 24/205.13 R |
| 4,157,603 | 6/1979 | Kowalski | 24/205.13 R |
| 4,171,556 | 7/1977 | Moertel | 24/205.13 R |
| 4,290,176 | 9/1981 | Wulz | 24/205.13 R |
| 4,291,440 | 9/1981 | Yoshida | 24/205.16 R |

Primary Examiner—Paul J. Hirsch
Attorney, Agent, or Firm—Karl F. Ross; Herbert Dubno

[57] ABSTRACT

A slide fastener has a pair of tapes along confronting edges of which are provided respective rows of coupling elements in a ladder configuration with individual members being affixed together by a continuous textile strand, as one-arm rungs of the ladder. Each coupling member is molded unitarily and unbent, and comprises an upper portion and a lower portion separated by a plane parallel to a slide fastener plane. The head of each coupling member lies above this plane and is mushroom-shaped to have a neck reaching inwardly toward the respective edge of the tape. Flush with this plane but on the lower half of the coupling member are a pair of ledges which function to absorb forces transverse to this plane. The connecting yarn is embedded in the upper half which can be provided for connection to the tape.

6 Claims, 10 Drawing Figures

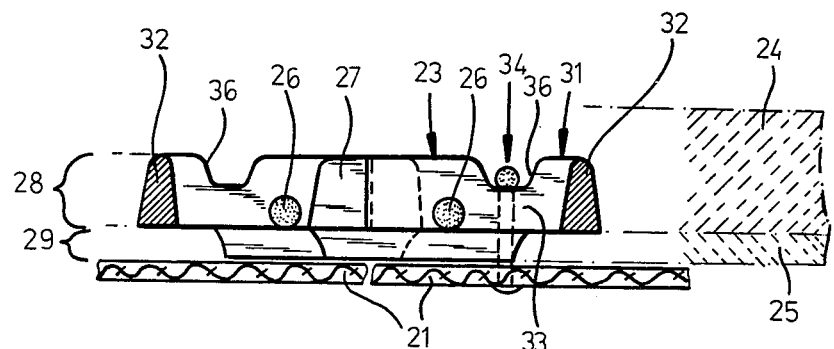
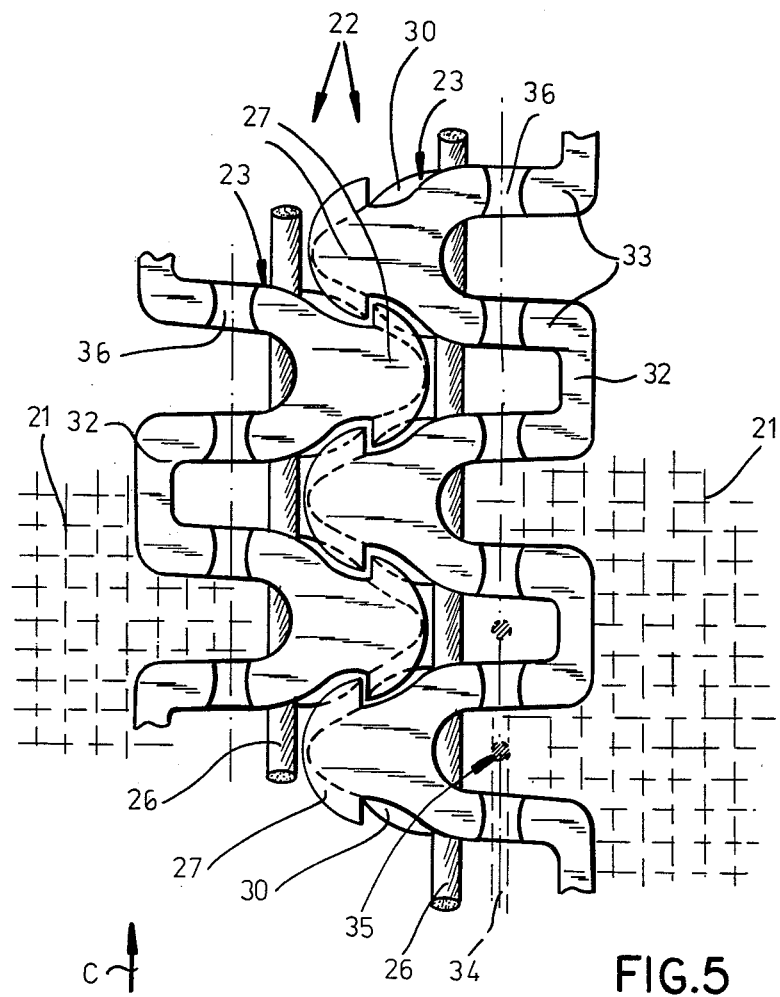

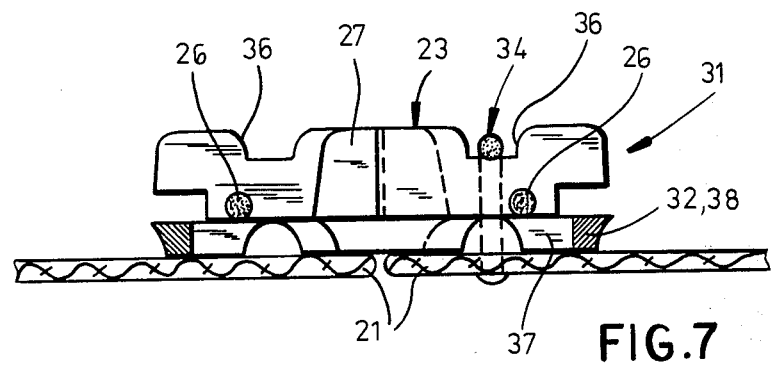
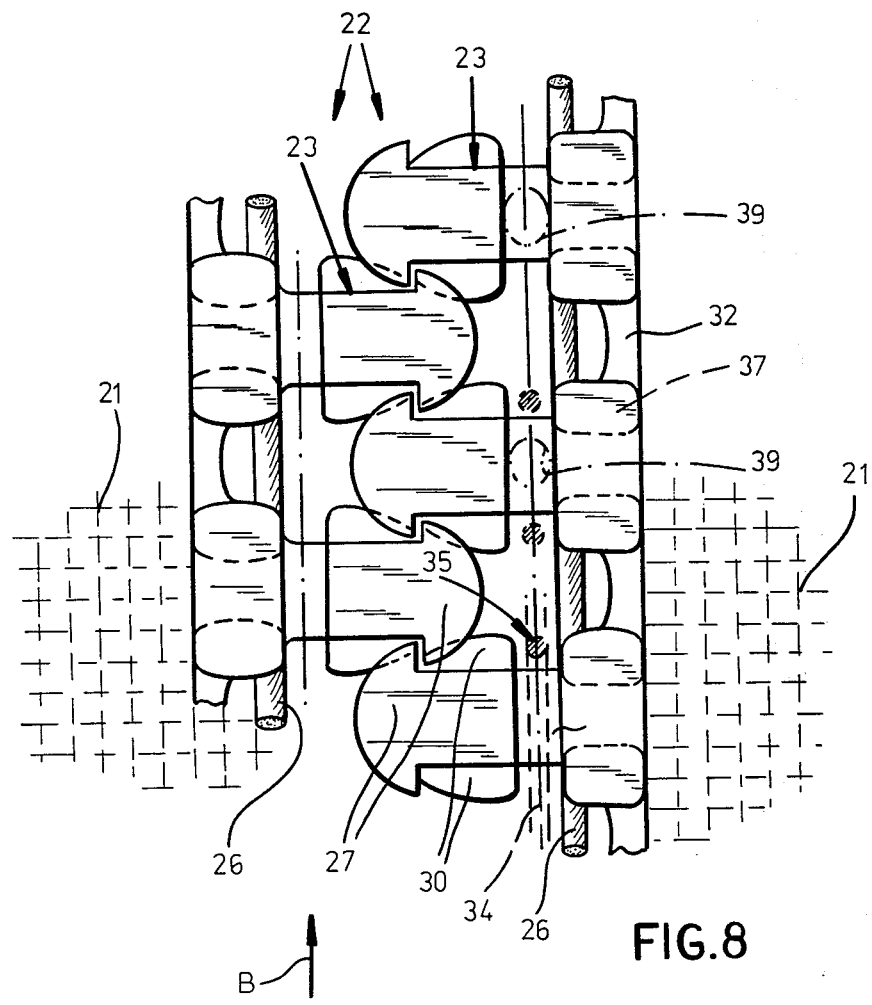

SLIDE FASTENER

FIELD OF THE INVENTION

The invention relates generically to a slide fastener with textile tapes and closure member rows connected thereto,
wherein the closure members are generated from thermoplastic materials by continuous injection molding on a form wheel and form band
and which are united by at least a longitudinally running support strip or a support strip assembly in the region outside their coupling heads into a closure member row. It is self-evident that the form wheel and the form band provide form beds and that the form band also has injection openings, where the aggregate of form wheel and form band passes continuously by a continuously working extruder for thermoplastic materials.

BACKGROUND OF THE INVENTION

The known slide fasteners of this type (German Offenlegungsschrift DE-OS 25 37 059) include a new generation of slide fasteners which in various embodiments are known as so called ladder rung zippers. In all these slide fasteners the closure members form a semifinished article with planar elements as ladder rungs and textile spars after the injection molding process and after the removal from the form wheel or from the assembly of form wheel and form band. The initially planar elements or fastening members are formed into the coupling elements by U-shaped bending. Upon the U-shaped bending the coupling head proper is generated, even though coupling surfaces of the coupling head can be formed during the injection molding process. By way of the U-shaped bending an eye also is generated in the region of the coupling head. The coupling head of the other slide fastener half with its coupling surfaces in each case is complementary to and fits into the eye. The eye generated upon bending of the initially planar rungs is essential for the coupling process. This may be the reason that slide fasteners of this type and similar ones are known only with U-shaped fastener members whether the U-arms of the fastener members are welded together or not.

The known slide fasteners of this type have proven successful in various embodiments in general. Nevertheless there are deficiencies. By injection molding extremely fine fastener members cannot be produced because the fastener members themselves must be thick orthogonal to the closure plane based on the U-shape of these fastener members. In addition the reforming of the initially planar rungs of the semifinished material to U-shaped fastener members represents additional work which has to be performed with very high precision. This is the case especially when the arms of the fastener members are welded together. While the described continuous injection molding process with form wheel and form band allows very high production speeds, the velocity of reshaping the initially planar rungs of the semifinished material to the U-shaped fastener members is substantially less. This interferes with the work speed and the economic performance of a complete production line. If the bending is not performed with the precision required then variations occur which interfere with the quality and in particular with the break-up strength. This is the case especially when fine soide fasteners are to be made as are required in the textile industry.

OBJECT OF THE INVENTION

The object of the invention is to provide an improved slide fastener such that a reforming of initially planar rungs of a semifinished material to U-shaped fastener members is no longer required.

SUMMARY OF THE INVENTION

The object is attained, in accordance with the invention, in that the fastener members are provided as identical one arm fastener members,
which show orthogonally to the zipper plane on top of each other a form wheel molded part with a mushroom-shaped coupling head as well as a formband molded part where at least one support strip or the support strip aggregate are embedded in the form wheel mold part,
and that in the transition region between the formwheel molded part and the formband molded part cross force locking elements are provided, which engage with the mating coupling head of the other zipper half. Cross force designates in the context of the present invention the forces effective orthogonal to the slide fastener plane in a finished stringer.

The invention begins with the recognition that in a slide fastener of this type it is not necessary that an eye has to be realized between the arms of U-shaped fastener members, into which the coupling surfaces of the coupling heads of other slide fastener half couple. Obviously, it has hitherto been overlooked that in the production by injection molding by way of form wheel and form band cross force from locking elements can be formed without difficulties, which elements provide to the finished slide fastener a sufficient cross force strength.

In a slide fastener in accordance with the invention the fastener member rows can be connected in various ways with their support tape. For example there is the possibility of interweaving or interlacing the fastener member rows with their support strip or with their support strips or aggregates of support strips, respectively, into the coordinated support bands. The fastener member rows are like warp yarns thereby introduced into the interweaving or interlacing process, as is known in principle. There is also the possibility to provide the fastener members of the fastener member rows on the upper side of their form wheel mold part with a molded in sewing yarn groove and to sew the coupling element onto coordinated support tapes, where the sewing yarns are positioned in the sewing yarn groove. In this context a further proposition of the invention is of importance. Thus the fastener members of the fastener member rows exhibit form locking moldings on the lower side of their form band mold part for impressing into a coordinated support tape. In the way described slide fasteners can be produced which are known as so-called simple slide fasteners where a slider comprising slider upper shield and slider lower shield surrounds the fastener member rows with intermediate position of the support tape in a slot between slider upper shield and slider lower shield. However, it is also possible to produce so-called covered slide fasteners where the slider comprises only a rudimentary slider under shield and surrounds the fastener member rows with its slider upper shield. It is within the scope of the invention in both cases to provide the fastener members also with slider guide provisions. It is further within the scope of the invention to provide the fastener members in the form-wheel molded part in addition with shaped, longitudinally running compound strips from thermoplastic material, which have been broken or cut up in the unification of the fastener member rows with the support tapes.

BRIEF DESCRIPTION OF THE DRAWING

The following description discusses additional features of the invention in more detail with reference to the accompanying drawing which is diagrammatic and substantially magnified compared to actual size; in the drawing:

FIG. 5 is in part a plan view onto another embodiment of the slide fastener according to the invention;

FIG. 6 is a view of the object of FIG. 5 from the direction of the arrow C;

FIG. 7 is a further embodiment of a slide fastener in accordance with the present invention corresponding to FIG. 5;

FIG. 8 is a view of the object of FIG. 7 from the direction of the arrow B;

SPECIFIC DESCRIPTION

Figure 1:
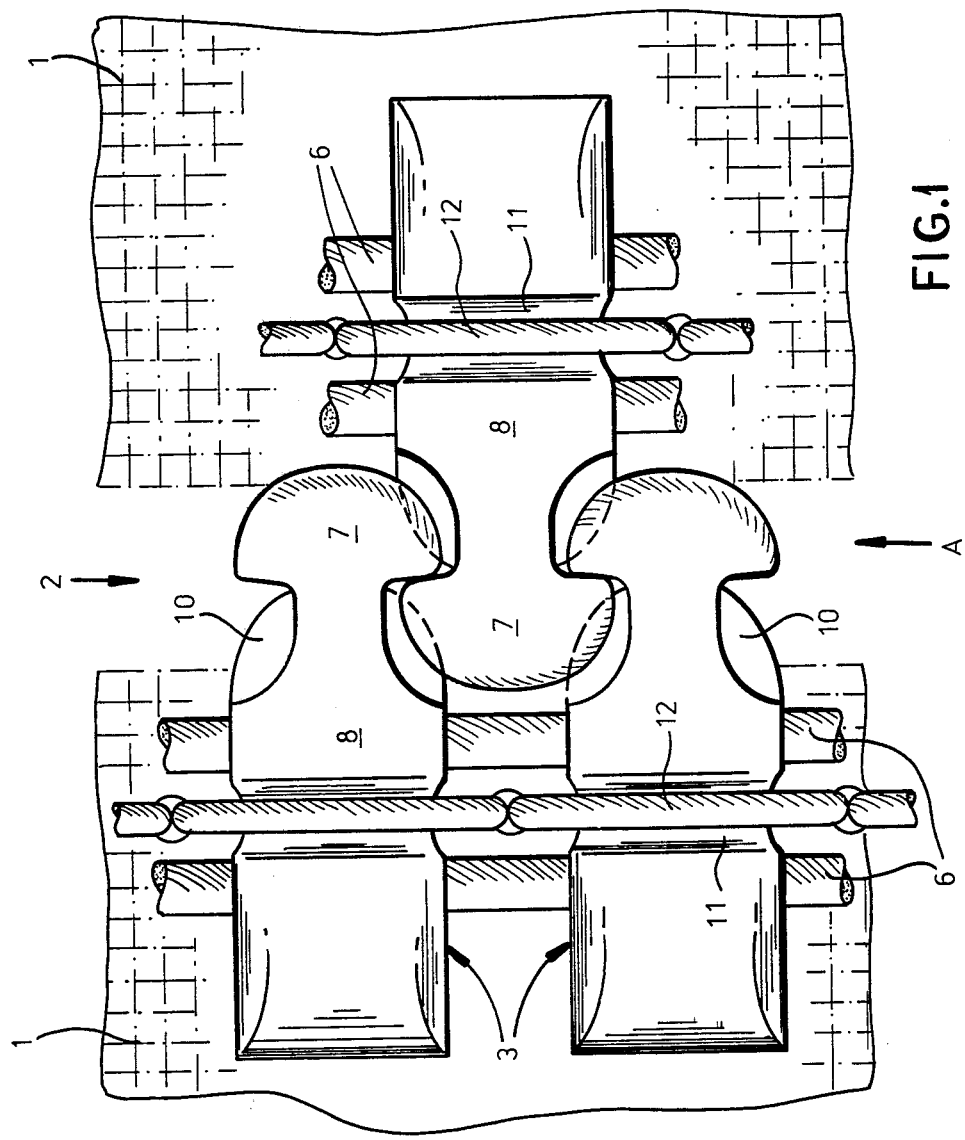
FIG. 1 is in part a plan view of a slide fastener according to the present invention with only indicated support tapes and without slider.
Figure 2:
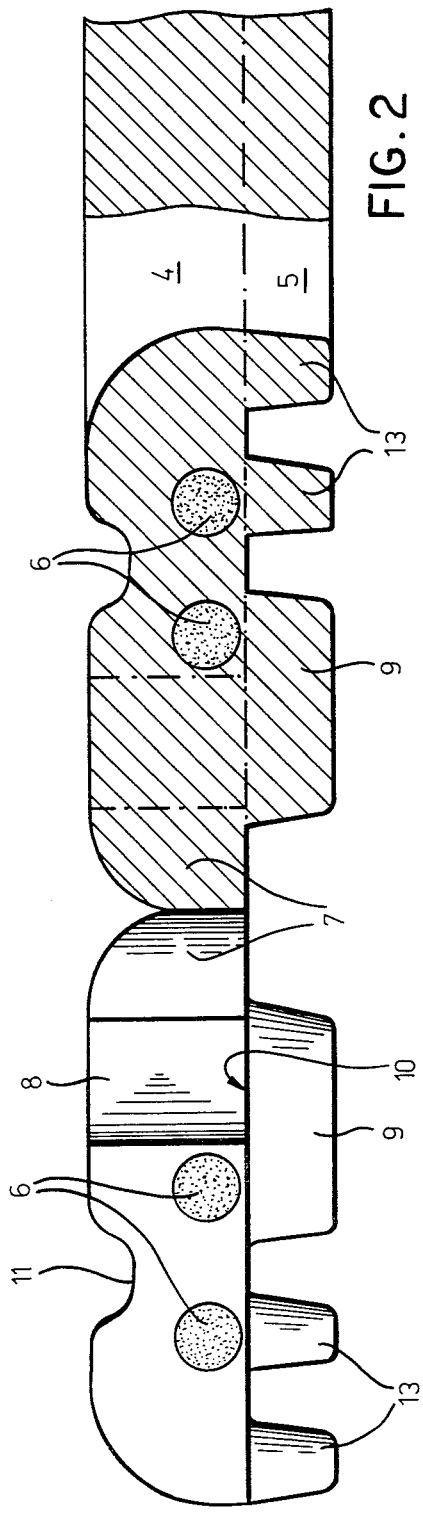
FIG. 2 is a view of the object of FIG. 1 in the direction of arrow A upon production by a formband and a form wheel.
Figure 4:
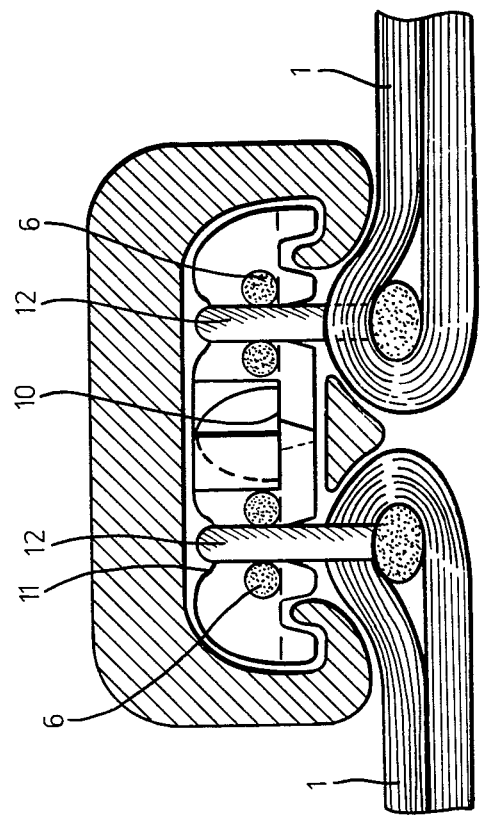
FIG. 4 is a sectional view with slider, however in the embodiment of a covered slide fastener.

The slide fastener shown in FIGS. 1 and 2 is formed as a simple slide fastener and is provided with textile support bands 1 and and fastener member rows 2 connected therewith. The slide fastener shown in FIG. 4 is a covered slide fastener.

The fastener members 3 are produced from thermoplastic material by way of continuous injection molding with overlapping form wheel 4 and form band 5, as is known in principle (compare for example German Offenlegungsschrift DE-OS 25 37 059).

Figure 3:
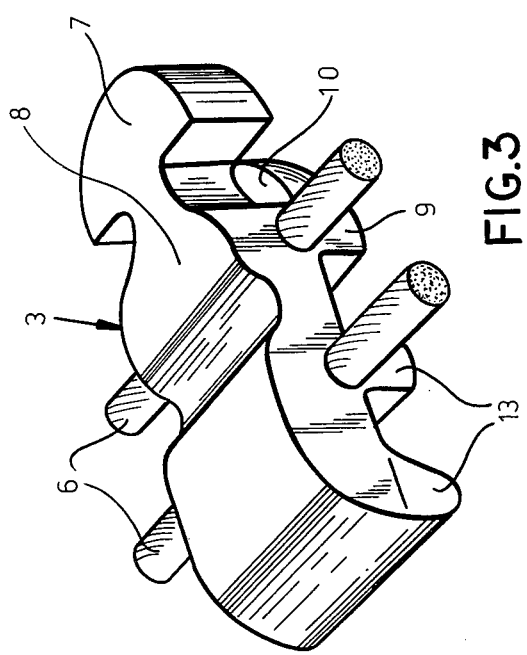
FIG. 3 is a perspective view of an individual fastener member according to FIG. 1.

The individual fastener members 3 are united by at least one longitudinally running support strip or a support strip aggregate 6 in the region outside of its coupling head 7. There the fastener members 3 are shown as uniform one arm fastener members 3. They have (compare in particular FIG. 2) orthogonally to the slide fastener plane and disposed on top of each other a form-wheel molded part 8 with mushroom shaped dome or coupling head 7 as well as a form-band molded part 9 where at least the support strip 6 or the support strip aggregate 6 are embedded into the form wheel molded part 8. It follows from the described manner of production that the form-wheel molded part 8 as well as the form-band molded part 9 are monolithically united with each other and thus represent a uniform injection molded part. Cross force form-locking elements 10 are formed in the transition region between the form wheel molded part 8 and the form-band molded part 9, which engage with the in each case coupled in coupling head 7 of the other slide fastener half. These cross-force form-locking elements 10 can be recognized in particular also in FIG. 3. The coupling process in total becomes clear from a comparing consideration of FIGS. 1 and 3. Basically the fastener member rows 2 could be interwoven or interlaced with corresponding support tapes 1. In the application example there is, however, shown an embodiment where the fastener member rows 2 are provided with a molded-in sewing yarn groove 11 on the upper side of their fastener members 3 in the form-wheel molded part 8. They are sewed onto the support tapes 1 where the sewing yarns 12 are disposed in the sewing yarn groove 11. Furthermore the fastener members 3 of the fastener member rows 2 are provided with form locking provisions 13 on the lower side of their form band molded part 9 in the embodiment for impressing into a coordinated support tape 1. Thus the fastener member rows 2 are attached safely and separation stabile to the corresponding support tape 1. It is not shown that the fastener members 3 of the fastener member rows 2 can be provided with additional shaped longitudinally running connecting strips from thermoplastic material in the form wheel molded part 8, which strips can be broken up or cut up upon unification with the support bands 1. It is within the scope of the invention to mold onto the one arm fastener members 3 also slider guide moldings and other auxiliary elements, and in fact at the form-wheel molded part 8 and/or at the form-band mold part 9 depending on the slide fastener type. In this context it is also referred to FIG. 4.

The zipper shown in FIGS. 5 to 8 is formed as a simple slide fastener and can have textile support tapes as support as well as fastener member rows 22 connected thereto. The zipper could similarly be formed as a covered slide fastener or it could immediately be sewed into a garment or the like. The fastener members 23 are produced from thermoplastic material by way of continuous injection molding with running form wheel and form band as is known in principle. The coaction of form wheel 24 and of form band 25 is indicated in FIG. 6 to the right of the one arm fastener members. The individual fastener members are united to a fastener member row 22 by at least one longitudinally running textile support strip 26 or a support strip aggregate in the region outside of their coupling head 27. There the fastener members are formed as uniform one arm fastener members 23. They have orthogonally to the slide fastener plane disposed on top of each other a form-wheel molded part 28 with mushroom shaped coupling head 27 as well as a form-band molded part 29, where the at least one support strip 26 or the support strip aggregate is embedded in the form-wheel molded part. It follows without further explanation from the described way of manufacture that the form-wheel molded part 28 as well as the form-band molded part 29 are united monolithically, that is they form a unified injection molding part. In the transition region between the form-wheel molded part 28 and the form-band molded part 29 there are provided cross-force form-locking elements 30, which engage with the in each case coupled in coupling head 27 of the other zipper half. These cross force elements can be recognized in particular in the FIGS. 5 and 7. The coupling process itself becomes clear in total by a comparing consideration of FIGS. 5 and 6. In principle, the fastener member rows 22 could be interwoven or interlaced in coordinated support bands 21. In the embodiment and according to a preferred mode of the invention there is employed a sewed seam attachment with the coordinated support tapes 21. In any case, the fastener member rows 22 are disposed safe and stabile against separation at the coordinated tape 21.

As well for the embodiment according to FIGS. 5 and 6 as well as also for the embodiments according to FIGS. 7 and 8 it is characterizing that the one arm fastener members 23 are provided with adapted connection pieces 32 at their foot piece 31 turned away from the coupling head 27 and directed in the zipper longitudinal direction. In the embodiment of FIGS. 5 and 6 the arrangement is provided such that the one arm fastener members 23 are parted into two half arms 33 at the rear region turned away from the coupling head 27. These two half arms 33 are disposed next to each other in the slide fastener plane. They are not to be mistaken with the arms of the fastener members, which are generated in the initially treated slide fasteners with U-shaped bent fastener members and which are superposed in a projection onto the slide fastener plane. The connection pieces 32 are joined to neighboring half arms 33 and form together with the half arms 33 in a projection onto the slide fastener plane a meander situated in the slide fastener plane. The textile support strip 26 or the support strip aggregate is disposed in the union region of the half arms 33 at a distance from the rear connecting pieces 32. This provides the possibility to provide punctures 35 in the region between the half arms 33 during the sewing seam attachment 34. The punctures 35 can further in a known way be performed between neighboring fastener members 23. Furthermore, there are provided sewing yarn grooves 36 of the sewing seam attachment 34 for the sewing yarn on the upper side of the half arms 33. Such can also be found in the embodiment according to FIGS. 7 and 8. In the embodiment according to FIGS. 7 and 8 the one arm fastener members 23 have furthermore form locking parts 37 on their bottom side turned to the tape 21 for impressing into the coordinated tape 21, where the rear connecting pieces 32 are attached to these form locking parts 37. They are in this embodiment together with the rear front side of the form locking parts 37 provided as fabric guard 38. It is conceivable to provide the one arm fastener members 23 also with formed in puncture holes 39 for a sewing seam attachment, as is indicated in FIG. 7 schematically with dot-dash lines.

Figure 9:
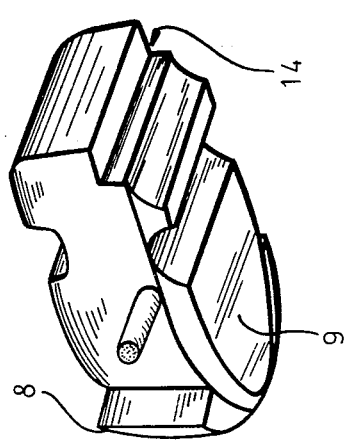
FIG. 9 is a perspective view of a one-arm fastener member for a slide fastener in accordance with the invention.
Figure 10:
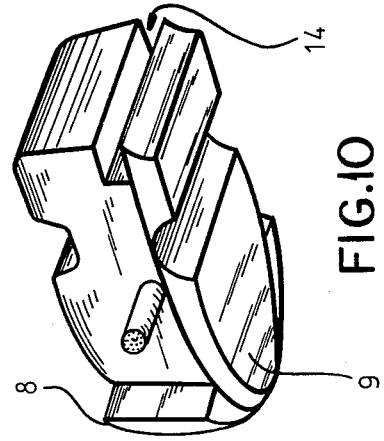
FIG. 10 is another embodiment of the object of the FIG. 9.

FIGS. 9 and 10 show in perspective individual one arm fastener members for the zipper in accordance with the invention. One recognizes the form wheel mold parts 8 as well as the form band mold parts 9 and rear cuts at A, which result from the manufacture carrying along additionally a rear cut band.

We claim:

1. A slide-fastener stringer comprising:
a pair of support tapes having confronting edges;
respective coupling elements extending along said edges and interdigitating upon movement of a slide along said coupling elements; and
means for securing said coupling elements to said tape, each of said coupling elements comprising:
at least one connecting textile cord running the length of the coupling element inwardly of the respective edge, and
a multiplicity of flat one-arm unbent coupling members affixed to said textile cord and projecting therefrom over the respective edge, each of said coupling members:
having a bottom surface bearing upon one side of said tape,
having a plane parallel to said tapes and subdividing each coupling member into an upper part and a lower part, said parts being molded unitarily with one another and lying above said bottom surface,
having a mushroom-shaped head projecting beyond the respective edge and formed exclusively on the upper part, and a neck reaching toward said edge,
having a pair of ledges formed above said bottom surface exclusively on said lower part with upwardly facing surfaces in said plane laterally projecting beyond said neck for engagement with interdigitating heads of the coupling element of the other tape to lock the interdigitated heads against forces perpendicular to said plane, and
having a shank region inwardly of the respective edge and engaged by said means, said shank region lying above said plane and embedding said cord therein.

2. The slide fastener defined in claim 1 wherein said shank region of each coupling member is formed with an upwardly open groove and said means includes a sewing yarn received in said groove.

3. The slide fastener defined in claim 1 wherein said shank regions are connected by strips forming a guide for said slider.

4. The slide fastener defined in claim 1 wherein each of said shank regions is connected by two yarns respectively attached to the shank regions of adjoining coupling members.

5. The slide fastener defined in claim 1 wherein said shank regions are provided with punctures.

6. The slide fastener defined in claim 1, claim 2, claim 3, claim 4 or claim 5 wherein the underside of said shank region is formed in said lower part and below said plane with formations engaging said tape.

* * * * *